May 4, 1943.  M. CORNELL  2,318,293

MATERIAL TREATING PROCESS AND APPARATUS

Filed Dec. 26, 1940  2 Sheets-Sheet 1

INVENTOR.
MEAD CORNELL

BY Oberlin, Limbach & Day
ATTORNEYS

May 4, 1943.  M. CORNELL  2,318,293
MATERIAL TREATING PROCESS AND APPARATUS
Filed Dec. 26, 1940  2 Sheets-Sheet 2
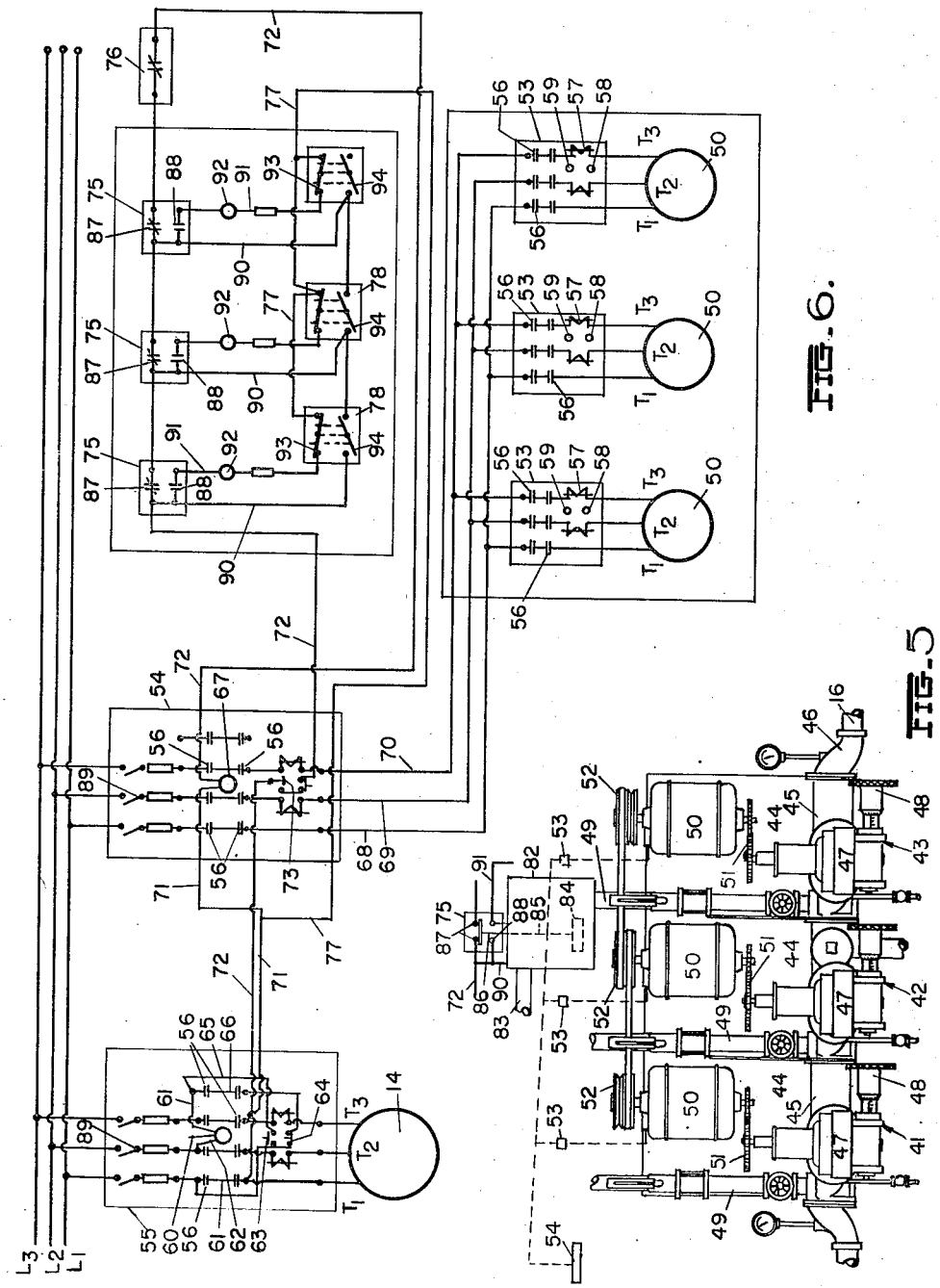
INVENTOR.
MEAD CORNELL
BY
Oberlin, Limbach & Day
ATTORNEYS.

Patented May 4, 1943

2,318,293

UNITED STATES PATENT OFFICE 2,318,293

MATERIAL TREATING PROCESS AND APPARATUS

Mead Cornell, Cleveland, Ohio, assignor to The Cornell Machine Company, Cleveland, Ohio, a corporation of Ohio Application December 26, 1940, Serial No. 371,842

13 Claims. (Cl. 259—3)

This invention relates to mixing apparatus, and, more particularly, to an improved arrangement of apparatus adapted to continuously blend and mix a plurality of fluid-like materials.

Where a mixer is provided for mixing one fluid material with another fluid material or other substance, it is desirable to provide apparatus which will feed the materials to the mixer in the proper proportions. A suitable form of such proportioning apparatus is shown in my prior Patent No. 2,109,331, issued February 22, 1938. The apparatus there shown provides separate feed devices for the materials to be mixed which are operable to positively feed such materials in the desired proportion to a common feed line. To complete the mixing of such materials, the inter-mingled materials in the feed line are then conducted to a mixer for the final mixing action and then conducted to a receptacle for storage. Since the proportioning apparatus and the mixing apparatus are provided with manually operable control devices, it is possible for the operator to cause operation of the proportioning apparatus without operation of the mixer apparatus. This would result in the delivery to the receptacle of a properly proportioned quantity of material which had not been mixed properly. In many cases, such as in the blending of oils, the delivery of a small amount of unmixed fluid to a receptacle containing several hundred gallons of properly mixed fluids would render the entire amount of fluid in the receptacle unsuitable and thereby cause considerable expense and trouble in re-mixing the entire quantity.

One of the principal objects of this invention is to provide a blending machine having proportioning apparatus and mixing apparatus in which the operation of the proportioning apparatus and mixing apparatus are interlocked to prevent operation of the proportioning apparatus when the mixing apparatus is inoperative.

A further object is to provide an improved arrangement of interlocked control devices for blending apparatus having separate proportioning and mixing mechanisms.

A further object is to provide an improved arrangement of control devices for proportioning apparatus of the character referred to.

A further object is to provide an improved fluid blending machine having a fluid proportioning feed mechanism and a fluid mixing mechanism in which operation of the feed mechanism is dependent upon operation of the mixing mechanism.

A further object is to provide an improved form of mixing apparatus particularly adapted for use in connection with a blending machine of the character referred to.

Other objects and advantages of the invention will become apparent during course of the following description.

To the acomplishment of the foregoing and related ends, said invention, then consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In the drawings, there is shown a preferred embodiment of the invention. In this showing:

Fig. 5 is a side elevational view of a proportioning device adapted to be employed in connection with the mixing device shown in Figs. 1–4, certain of the control parts being diagrammatically illustrated, and parts thereof being shown as broken away;

Fig. 6 is a view diagrammatically illustrating the arrangement of a control circuit for the combined mixing apparatus of Figs. 1–4, and the proportioning apparatus of Fig. 5.

Mixing apparatus

Figure 1:
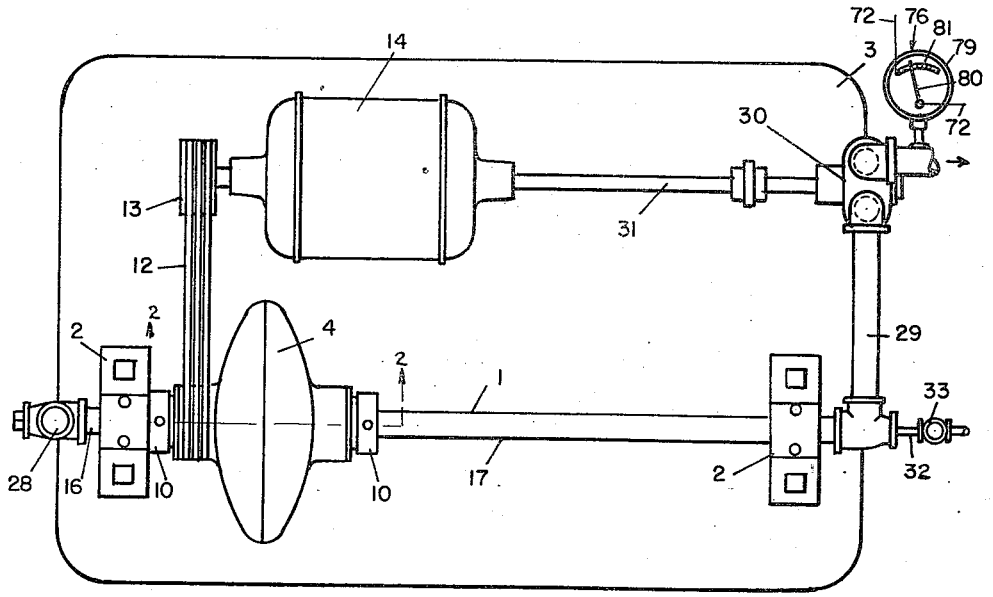
Fig. 1 is a top plan view of apparatus constructed in accordance with the principles of this invention.

Referring now to the drawings, and particularly to the showing of Figs. 1 to 4, there is shown a mixing apparatus particularly adapted for use as a part of the material treating process and apparatus of this invention. The mixing apparatus in this showing represents an improvement in the method and apparatus for treating materials illustrated and described in my U. S. Letters Patent No. 2,042,880. In my said prior patent, there is described a mixing method and apparatus which involves the impounding of the material to be treated or mixed centrally of a rapidly rotating disk, and the feeding of such impounded material onto the disk in a film for a centrifugal attenuating mixing action. The attenuated film, in that apparatus, is collected by intercepting the same without interrupting the continuity of the projected film through the provision of a deflector ring against which the film is centrifugally projected at an angle for deflection to the side of a container down which the film flows by gravity to the reservoir provided by the container. An important advantage of such apparatus is that the material is mixed without a breaking up or spraying action, which is extremely important in mixing certain types of materials, such as in the blending of lubricating oils having different densities.

The improvement in the mixing mechanism of Figs. 1 to 4 involves the elimination of the container of my prior patent and an important change in the manner or method of collecting the attenuated film. The elimination of the container of my prior patent is accomplished by employing the rotating member, which effects the attenuating action, as a means for receiving and centrifugally holding the attenuated film. More specifically, such improvement consists in employing a rotatable casing which is provided with a material working surface on which the material to be mixed is delivered for the centrifugal attenuating action. The outer part of the casing provides a trough-like receptacle into which the attenuated film is projected and held by centrifugal force, novel mechanism being provided for displacing the centrifugally held fluid to effect a discharge action of such fluid. By thus collecting and discharging the attenuated film, any breaking up or spraying of the mixed material is substantially positively prevented by the present apparatus.

In the showing of Figs. 1-4, the numeral 1 indicates a stationary, hollow shaft mounted in supports 2, 2, carried by a foundation structure 3. The shaft 1 extends axially through a rotatable casing 4 comprising dish-shaped disks 5 and 6 having their outer peripheral edges respectively bolted together in fluid-sealing engagement by means of bolts 7 to provide a space 8 interiorly of the casing 4. Each of the disks 5 and 6 is rotatably supported on the hollow shaft 1 by means of suitable bearing assemblies 9, 9 providing a fluid seal for the openings in the casing 4 through which the hollow shaft 1 extends. End thrust bearings 10, 10 are provided for holding the casing in its proper possition on the hollow shaft 1.

The disk 6 is provided with annular grooves 11 for engagement with belting 12, which is operable through a pulley 13 driven by a motor 14 mounted on the supporting structure 3, for imparting a rotating movement to the casing 4.

Figure 2:
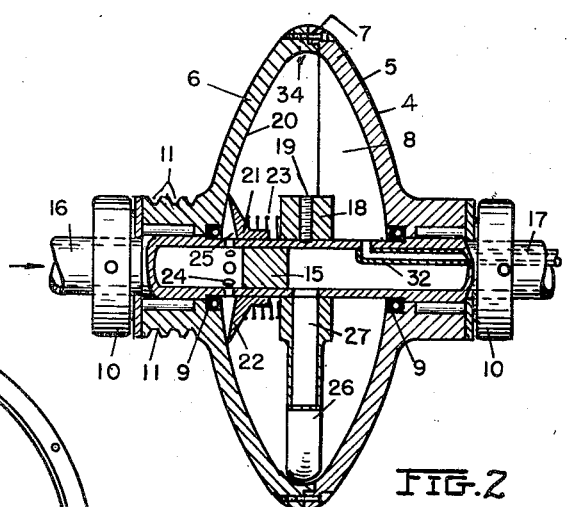
Fig. 2 is a sectional view taken substantially on the line 2—2 of Fig. 1.

As best shown in Fig. 2, the hollow shaft 1 is provided with a plug 15 dividing such shaft into an inlet portion 16 and an outlet portion 17, respectively extending into the interior 8 of the casing 4 from opposite sides thereof. An annular collar 18 is mounted on the shaft 1 substantially centrally of the casing 4 and is provided with a threaded opening 19 for the reception of a set screw (not shown) engageable with the shaft 1 to hold the collar 18 in position.

The disk 6 is formed with an annular working surface 20 providing a generating element which has an appreciable axial component considerably smaller than its radial component for causing fluid fed onto such surface to centrifugally flow outwardly thereover in the form of a highly attenuated, continuous film, mechanically supported on one side only. The manner in which the working surface 20 of the disk 6 operates is much the same as the rapidly rotating disk of my prior patent to which reference is made for a more particular description.

An annular spreader ring 21 is mounted for axial and rotational movement on the shaft 1 between the collar 18 and the disk 6. The spreader ring 21 is provided with a flange 22 engageable with the inner peripheral edge of the working surface 20, a light spring 23 being provided for maintaining the flange 22 in engagement with the inner peripheral edge of the working surface 20. Openings 24 are provided in the inlet portion 16 of the shaft 1 for feeding fluid into the space 25 provided between the flange 22 and the disk 6.

A hollow tube 26 is mounted on the collar 18 and is connected to the outlet portion 17 of the shaft 1 by means of an opening 27 formed in the collar 18 and shaft 1. The tube 26 is adapted to effect a discharge action of the attenuated fluid in a manner to be described.

A valve 28 is provided for controlling the flow of fluid to be treated to the interior of the casing 4. The outlet portion 17 of the shaft 1 is connected by means of a conduit 29 to a discharge pump 30 mounted on the supporting structure 3, the discharge pump 30 being operated from the motor 14 by means of a shaft 31.

The operation of the apparatus is as follows:

The motor 14 is preferably started to impart rotation to the casing 4 with the valve 28 closed. With the valve 28 closed, the discharge pump 30 will be operable to create a vacuum in the interior 8 of the casing 4 which will be effective for most purposes, and which will be maintained after opening the valve 28, since the pump 30 will withdraw the material being operated on as fast as it is permitted to enter the casing 4 through the valve 28. In the event that this vacuum is insufficient, the interior 8 of the casing 4 may be connected through a conduit 32 and valve 33. to apparatus (not shown) suitable to maintain a vacuum in the interior 8 of the degree desired.

Upon opening the valve 28, the fluid to be treated or mixed will be forced through the conduit portion 16 and openings 24 into the space 25. The pressure of this fluid will cause the spreader ring 22 to be moved axially against the action of the spring 23 to feed a continuous film of fluid onto the working surface 20 over which it will be centrifugally projected in the form of a highly attenuated, continuous film supported on one side only. The connection of the disks 5 and 6 provides an annular trough or receptacle 34, facing radially inwardly, into which the attenuated film will be projected. The film, upon flowing into the trough 34, will be thickened into a centrifugally held fluid body.

Figure 3:
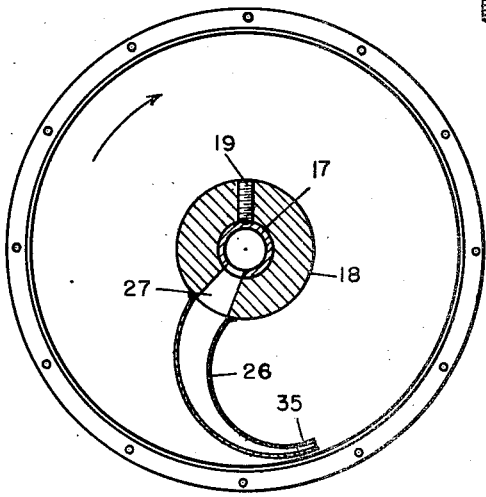
Fig. 3 is a partially disassembled view showing the parts, in section, by which the centrifugally held fluid is picked up for a discharging action.

The tube 26, in effecting a discharge of the centrifugally held fluid body in the trough 34, operates in much the same manner as a static tube. As best shown in Fig. 3, the tube 26 is curved to provide an end 35 having an opening projecting into the path of the centrifugally held fluid. The opening in the end 35, extending in a direction opposed to the direction of movement of the centrifugally held fluid, will be operative to deflect such fluid from its path of movement through the interior of the tube 26 and the opening 27 into the outlet portion 17 of the shaft 1 for withdrawal under the influence of the discharge pump 30. It will be noted that the manner in which the static tube 26 is arranged enables the velocity head of the centrifugally held fluid to be utilized in effecting a discharge action of such fluid.

Figure 4:
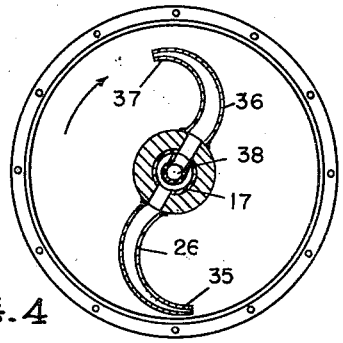
Fig. 4 is a view similar to Fig. 3 showing a modified form of apparatus for picking up and discharging the centrifugally held fluid.

This invention also contemplates the use of an additional tube 36, as best shown in Fig. 4, where it is desired to discharge fluids from different levels of the centrifugally held fluid body, the end 37 of the tube 36 being spaced further inwardly from the outer portion of the trough 34 than is the case with the end 35 of the tube 26. In the use of the tube 36, it will be noted that a second conduit 38 is connected thereto and is positioned interiorly of the conduit 17 for maintaining the fluids collected by the tubes 26 and 37 separate from each other. In such case, it will be apparent that the conduit 38 will extend axially outwardly through the conduit 17 and will be connected to an additional discharge pump (not shown) separate from the discharge pump 30.

From the foregoing, it will be apparent that there is provided a novel form of mechanism for performing an attenuating mixing action on a fluid body together with novel means for collecting the attenuated fluid body. It will be particularly noted that the manner in which the attenuated fluid body is centrifugally held in the trough 34 and the manner in which the static tubes pick up the centrifugally held fluid body for discharging action substantially positively prevents any breaking up or spraying of the attenuated film after it has been centrifugally projected from the working surface 20 of the disk 6.

*Proportioning apparatus*

Having thus described the mixing apparatus of my blending machine, reference is now made to the showing of Fig. 5 for an understanding of the proportioning apparatus which is employed for delivering the fluid to be mixed through the conduit 16 to the mixing unit. This proportioning unit is of the type illustrated in my prior Patent No. 2,109,331 to which reference is made for a more complete description and understanding of the working parts thereof.

For the purpose of this description, it will be sufficient to point out that the proportioning unit, Fig. 5, comprises a plurality of separate feed units, respectfully indicated as a whole, by the numerals 41, 42 and 43. Each of these units comprises a base or panel board 44 having a transverse passage 45 at the bottom thereof. Upon assembly of the feed units, the transverse passages 45 form a conduit which is connected to the out-fall conduit 46, the out-fall conduit being connected to the feed conduit 16 for delivering the proportion fluid to the mixing unit shown in Figs. 1 to 4.

Each of the transverse passages 45 supports and is provided with suitable connections to a variable displacement pump 47, which is provided with a suitable adjusting device 48 for varying the pumping capacity of the pump 47. Each of the pumps 47 is provided with a supply conduit 49 for delivering fluid to be proportioned and mixed thereto, the pump 47 being operative to meter the material into the transverse passage 45. Drive motors 50 are mounted on each of the base members 44 and are connected through gearing 51 to the pumps 47 for driving such pumps. In order to synchronize all of the motors 50, each of such motors is provided with a pulley 52 which is releasably secured to the drive shaft of the motor 50. The pulleys 52 are interconnected through belting which is thus operable to cause all the motors 50 to operate at the same speed and prevent one of the motors from running faster than other of the motors. Synchronization of the operation of the motors 50 may be obtained by suitable electrical means, if desired. If the operation of one of the motors 50 is to be discontinued, it is merely necessary to release the pulley 52 from driving engagement with the drive shaft of such associated motor and the parts associated with such motor may then be rendered inoperative by stopping the flow of current to such motor. Motors 50 are separately, electrically energized from a single power line, individual switches 53 being employed for the purpose of controlling the energization of the motors 50 and a single main switch 54 being employed for the purpose of simultaneously energizing and deenergizing the entire bank of motors or those selected for a particular operation.

Although the proportioning apparatus of Fig. 5 is shown as having three feed units, it will be understood that any number of such units may be employed in accordance with the teachings of my Patent No. 2,109,331. By this arrangement, it is possible to deliver a plurality of fluids to the feed line 16 in the desired proportion. If more feed units are provided than there are fluids to be mixed, it is merely necessary to cut out the unnecessary feed units by releasing the pulleys 52 and stopping the flow of current to the motors 50 of such unnecessary units.

*Control apparatus*

In Fig. 6, there is shown a preferred arrangement of controls in a three-phase circuit for the apparatus shown in Figs. 1 to 5. In this showing, the discharge and mixing motor 14 and the proportioning feed motors 50 are diagrammatically illustrated together with the individual control switch units 53 and main switch unit 54 for the feed motors 50 and a control switch 55 for the feed motor 14 and for the main switch 54. Power is supplied from power lines L1, L2 and L3, through the control switches to the motor terminals T1, T2 and T3, in a manner to be described. Each of the switches 53, 54 and 55 are conventional switches which may be readily purchased on the market and are provided with contactors 56 in each of the motor terminal lines T1, T2, and T3, adapted to open and close the circuits in these lines, respectively upon energization and deenergization of a magnetic holding coil in a manner well-known in the art. The switches 53, 54 and 55 are likewise provided with over-load re-set devices 57 operable in a manner well-known in the art. The switches 53 are provided with manually operable stop buttons 58 and start buttons 59 for opening and closing the circuits to the individual feed motors 50. The hook-up of the control buttons 58 and 59 to the magnetic holding coil controlling the opening and closing of the circuit through the contactors 56 in the switches 53 is operable in the usual manner and accordingly, the holding coil and electrical hook-up is not illustrated in the switches 53.

Referring to the switch 55, the magnetic holding coil is indicated by the numeral 60 and has one side thereof connected through a line 61 to one of the leads on the power line side of the switch 55. The coil 60 has its other side connected through the lead 62 to another lead on the power line side of the switch 55. The energization of the magnetic holding coil 60 is controlled by a start switch 63 and a magnetically operable sticker switch 64, respectively in a lead 65 and an interlock 66, adapted to alternately constitute a part of the line 61. Each of the switches 63 and 64 are preferably provided with biases (not shown) maintaining such switches in open position. In order to energize the holding coil 60 and start operation of the motor 14, the switch 63 is first closed to complete the circuit 61 through the line 65 and as soon as this is done, the coil closes the contactors 56 and energizes a magnetic coil (not shown) to move the switch 64 to closed position against its bias and the circuit 61 is then completed through the interlock 66. The switch 63 may then be released without effecting operation of the holding coil 60 or stopping operation of the motor 14. To deenergize the holding coil 60 and thereby break the circuit to the motor 14 through the various contactors 56, it is then merely necessary to manually move the switch 64 in the direction of its bias against the action of the magnetic holding coil normally operable to hold the switch 64 in closed position. This breaks the circuit through the interlock 66 and deenergizes the coil 60 to permit opening of the contactors 56. The switch 54 is provided with a holding coil 67 and associated parts similar to those described in connection with the switch 55 for connecting and disconnecting the common leads 68, 69 and 70 for the motors 50 with the power lines L1, L2 and L3. One side of the holding coil 67 is connected through a line 71 to one of the leads T3, of the switch 55 on the motor side of such switch. The other side of the holding coil is connected by a line 72 and various switches in a manner to be described, to another of the leads T1, of the switch 55 on the motor side of such switch. At this point, it will be noted that it will be impossible to effect operation of the holding coil 67 to close the circuit to the various feed motors 50 unless the mixer and discharge motor 14 is operating due to the line 71, 72 being connected to the leads on the motor side of the switch 55.

The line 72 is completed through a manually operable control switch 73 on the main switch 54, a plurality of float switches 75 and a pressure switch 76. Operation of the switch 73 is thus inoperative to effect starting of the motors 50 unless the lines 72 and 71 are energized as described above. A by-pass circuit 77 is also provided in conjunction with manually operable snap switches 78 for electrically connecting the line 72 to the line 71, other than through the coil 67, in a manner to be described.

Referring now to Fig. 1, the manner in which the pressure switch 76 is operable will now be described. The outlet conduit on the discharge side of the pump 30 is provided with a pressure indicator 79 having an electrical contact indicator member 80 and a stationary contact member 81. One part of the line 72 is connected to the indicator member 80 and the other part of the line is connected to the stationary contact member 81. Upon an obstruction being encountered in the outlet side of the pump 30, the pressure will rise and move the contact member 80 out of engagement with the contact 81, thereby interrupting the flow of current in the line 72. This action will deenergize the coil 67 and cause the switch 54 to automatically open and stop operation of all the feed pumps 50.

Each of the control switches 54 and 55 are shown as provided with circuit breaker switches 89 which may be omitted if desired.

Referring now to Fig. 5, the manner in which the float switches 75 are operable will now be described. The supply line 49 for the feed unit 43 is shown as having a reservoir 82 adapted to receive fluid from a supply line 83. A float 84 is mounted within the reservoir 82 and is connected by an actuating member 85, to a switch 86. When the level of fluid within the reservoir 82 falls below a predetermined level, the float 84 will move downwardly and break the circuit through the contacts 87 and close the circuit through the contacts 88 for a purpose to be described. In Fig. 6, the contacts 87 are shown as being in closed position and the contacts 88 are shown as being in open position. When the fluid in the reservoir 82 falls to a point permitting movement of the switch member 86 out of engagement with the contacts 87, the circuit through the line 72 to the holding coil 67 will be broken to deenergize the holding coil 67 and stop operation of all the feed pumps 50. Although there has been shown only one reservoir 82 for one conduit 49 in Fig. 5, it will be understood that all conduits 49 are supplied with reservoirs 82 and limit switches 86 in the same manner as shown for the feed device 43. It will also be understood that the showing of the switch unit 75 in Fig. 5 is only diagrammatic and that as soon as the switch 86 moves out of engagement with the contacts 87 to open the circuit through the line 72, the switch 86 will immediately move into engagement with the contacts 88 for a purpose to be described. In this respect, it will be understood that the switch 86 will be constructed in such manner that there will be no lost time between the opening of the contacts 87 and the closing of the contacts 88, and that conventional snap action or other type switches readily purchasable on the market will be employed for this purpose.

Referring to Fig. 6, the manner in which the manually operable snap switches 78 and by-pass circuit 77 cooperate with the contacts 88 of the float switches 75 will now be described. Each of the switches 75 is provided with a line 90 having electrical connections with each of the contacts 87 and 88 on the front or power side of such contacts. The contacts 88 are operative to connect the line 90 with a line 91 which is connected to a lamp or other signaling device indicated by the numeral 92. The switches 78 are provided with two simultaneously operable contact members 93 and 94. The contact members 93 are normally closed and operate to connect the lines 91 with the by-pass circuit 77.

The switch element 94 of the switch 78 is provided in order to cut out of the circuit those float switches 75 which are associated with feed devices which it is not desired to operate. This will enable the apparatus to operate without interference by a float switch of a feed device which is not being operated. Assuming that it is desired to cut out the feed device 41 of Fig. 5 and that the float switch 75 furthest to the left as viewed in Fig. 6, is the float switch associated with such feed device, then the switch unit 78 immediately underneath such float switch will be operated to close the switch element 94 and open the switch element 93. Upon cutting out the feed device 41, the reservoir 82 associated therewith will be drained, thus causing the switch 86 to open the contacts 87 and close the contacts 88. It will be recalled that this action opens the circuit 72. By closing the switch element 94 the current is taken around the switch 75 having the open contacts 87, to complete the circuit through the line 72. In such case current will flow through the switch 73, line 72, line 90, switch element 94 to the next switch 78, line 90 connected to the next succeeding float switch 75, and thence through its usual path to the holding coil 67. In this manner, the holding coil 67 is made operative to close the main switch 54 and permit current to be fed to the motors of those feed devices which it is desired to operate.

*Control apparatus operation*

To place the apparatus in operation, the switch 63 is operated to energize the holding coil 60 and to close the switch 55 to start operation of the motor 14. Operation of the motor 14 will start operation of the mixing unit 4 and pump 30 in the manner described above for the mixing apparatus. To cause the proportioning apparatus of Fig. 5 to feed material to the mixing apparatus of Figs. 1 to 4, the switch 73 will then be closed to connect the line 72 through the float switches 75 and pressure switch 76 to the holding coil 67. The holding coil 67 will then operate to close the switch 54 to permit current to be supplied to the motors 50 of each of the separate feed devices. The feed devices, 41, 42 and 43 will then deliver fluid to the line 16 and to the mixing unit 4, from which it will be withdrawn by the pump 30 and be delivered to the receptacle provided for the mixed material.

In the event that it is desired to immediately stop operation of all the apparatus, it is merely necessary to open the switch 64 to deenergize the holding coil 60. This action opens the switch 55 and stops operation of the motor 14. Upon current ceasing to flow to the motor 14, the lines 71 and 72 will be deenergized and the holding coil 67 will permit the switch 54 to open automatically and thereby cut off the supply of current to the motors 50 and stop operation of the feed devices associated with such motors.

In the event that the supply of fluid in one of the reservoirs 82 falls below a desired level, one of the switches 86 will operate to open the circuit through the contacts 87 and close the circuit through the contacts 88. Opening of the circuit through the contacts 87 will interrupt the flow of current through the line 72 and cause the switch 54 to operate to stop operation of all the feed devices. Upon opening of the contacts 87 to stop operation of the feed devices of the proportioning unit, the contacts 88 will close and current will continue to flow through the line 72, but will be conducted through the line 90 and across the contacts 88 to the line 91 and thence through the switch element 93 to the by-pass circuit 77 which is connected to the hot line 71. It will therefore be apparent that the light 92 associated with the contact 88 will be operated to inform the operator as to which of the feed devices has functioned to stop operation of the proportioning unit. The operator will then go to such feed device and remedy the cause interfering with the supply of material to the reservoir 82 of such feed device in order to cause operation of the proportioning unit to be resumed. In this way operation of the proportioning unit to feed an improperly proportioned quantity of material to the mixing apparatus, through failure of one of the feed devices, is effectively prevented through the interlocking of the operation of the motor 14 with the operation of the proportioning unit which causes the proportioning unit to automatically shut down upon interruption of operation of the mixing unit drive motor 14.

From the foregoing, it will be apparent that the interlocked arrangement of the proportioning and mixing units of this invention, making operation of the proportioning unit dependent upon operation of the mixing unit, effectually prevents an operator from causing an untimely operation of the feeding unit, and thereby makes certain that no material will go through the mixing unit without being properly mixed or homogenized. It will also be apparent that this same arrangement enables the operator to shut down the feeding or proportioning unit simultaneously with the shutting down of the mixing unit. The controls for the proportioning unit likewise cooperate to the common end of preventing material from going through the mixer in an undesired manner by automatically shutting down the operation of the entire feeding unit when a condition arises which might result in an improperly proportioned quantity of material being fed to the mixer. It will also be noted that the signals 92 enable the operator to go immediately to that feed device which has operated to shut down the proportioning unit and correct the trouble which might have resulted in the feeding of an improperly proportioned quantity of material to the mixing unit.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:

1. Apparatus of the character described comprising, in combination, a rotating member having an annular material working surface, and means for feeding a fluid body onto said surface as a film for a centrifugal attenuating action, said member having a confining part radially outwardly of said working surface constructed to provide a confined space for receiving the attenuated fluid body projected from said surface and for holding such body in said space by centrifugal force.

2. Apparatus of the character described comprising, in combination, a rotating member having an annular material working surface, means for feeding a fluid body onto said surface as a film for a centrifugal attenuating action, said member having a confining part radially outwardly of said working surface constructed to provide a confined space for receiving the attenuated fluid body projected from said surface and for holding such body in said space by centrifugal force, and means for picking up and discharging from said space the centrifugally held fluid body.

3. Apparatus of the character described comprising, in combination, a rotating member having an annular material working surface, and means for feeding a fluid body onto said surface as a film for a centrifugal attenuating action, said member being formed to provide an annular trough adjacent the outer peripheral edge of said working surface and facing radially inwardly with respect thereto, said trough being adapted to receive the attenuated fluid body projected from said surface and to hold such body therein by centrifugal force.

4. Apparatus of the character described comprising, in combination, a support, a casing having an annular material working surface rotatably mounted on said support, means for rotating said casing, means for feeding a fluid body onto said surface as a film for a centrifugal attenuating action, the radial outer part of said casing providing an annular rotating receptacle into which the attenuated fluid body may be projected and held by centrifugal force, and means for displacing radially inwardly the centrifugally held fluid body to discharge the same from said rotating receptacle.

5. Apparatus of the character described comprising, in combination, a support, a casing having an annular material working surface rotatably mounted on said support, means for rotating said casing, means for feeding a fluid body onto said surface as a film for a centrifugal attenuating action, the radial outer part of said casing providing an annular rotating receptacle into which the attenuated fluid body may be projected and held by centrifugal force, a hollow shaft extending into the interior of said casing, and a stationary tube having one end connected to said shaft and having the other end projecting into the path of the centrifugally held fluid, said other end having an opening extending in a direction opposed to the path of the centrifugally held fluid through which such fluid may be deflected and conducted to said hollow shaft for discharge from said casing.

6. Apparatus of the character described comprising, in combination, a support, a casing having an annular material supporting and conveying surface rotatably mounted on said support, said surface providing a generating element having an appreciable axial component considerably smaller than its radial component, means for feeding a fluid body onto said surface as a film for a centrifugal attenuating action, the radial outer part of said casing providing an annular rotating receptacle for receiving and thickening into a fluid body the attenuated body centrifugally projected from said surface, the thickened fluid body being held in said outer part by centrifugal force, a conduit extending centrally into the interior of said casing, and a tube having one end connected to said conduit and having the other end projecting into the path of the centrifugally held fluid, said other end having an opening extending in a direction opposed to the path of travel of the centrifugally held fluid through which such fluid may be deflected from its path and conducted to said conduit for discharge from said casing.

7. Apparatus of the character described comprising, in combination, a hollow shaft, a casing having an annular material supporting and conveying surface rotatably mounted on said shaft, said shaft extending axially through said casing and being divided into inlet and outlet portions, means for feeding a fluid body through said inlet portion onto said surface as a film for a centrifugal attenuating action, the radial outer part of said casing providing an annular rotating trough for receiving and thickening into a fluid body the attenuated body centrifugally projected from said surface, the thickened fluid body being held in said outer part by centrifugal force, and means utilizing the velocity head of the thickened fluid body for deflecting the same inwardly to said outlet portion to effect a discharge action thereof from said trough.

8. The method of treating materials which comprises the steps of centrifugally attenuating said materials into a continuous film, and thickening and collecting the attenuated film into a centrifugally held body.

9. The method of treating materials which comprises the steps of centrifugally attenuating said materials into a continuous film, thickening and collecting the attenuated film into a centrifugally held body, and picking up said materials by deflecting the same from said centrifugally held body.

10. The method of treating materials which comprises the steps of centrifugally attenuating said materials into a continuous film, thickening and collecting the attenuated film into a centrifugally held body, and utilizing the velocity head of the centrifugally held body to displace the materials from the centrifugally held body by deflecting the materials therein into contact with a stationary surface.

11. The method of treating materials which comprises the steps of maintaining an impounded quantity of the materials centrally of a rotating member, radially displacing the materials into a continuous film supported on one side only by said rotating member, centrifugally attenuating said film, and thickening and collecting the attenuated film into a centrifugally held body.

12. The method of treating materials which comprises the steps of maintaining an impounded quantity of the materials centrally of a rotating member, radially displacing the materials into a continuous film supported on one side only by said rotating member, centrifugally attenuating said film, thickening and collecting the attenuated film into a centrifugally held body, and picking up said materials by deflecting the same from said centrifugally held body.

13. The method of treating materials which comprises the steps of maintaining an impounded quantity of the materials centrally of a rotating member, radially displacing the materials into a continuous film supported on one side only by said rotating member, centrifugally attenuating said film, thickening and collecting the attenuated film into a centrifugally held body, and utilizing the velocity head of the centrifugally held body by bringing the materials therein into contact with a stationary surface to deflect and displace the materials therein from the centrifugally held body.

MEAD CORNELL.